W. J. BEHN.
UNIVERSAL JOINT.
APPLICATION FILED FEB. 16, 1920.

1,376,504.

Patented May 3, 1921.
2 SHEETS—SHEET 1.

INVENTOR
Walter J. Behn
by MacLeod, Calver, Copeland & Dike
Attys

W. J. BEHN.
UNIVERSAL JOINT.
APPLICATION FILED FEB. 16, 1920.

1,376,504.

Patented May 3, 1921.
2 SHEETS—SHEET 2.

INVENTOR:
Walter J. Behn
by Macleod, Calvert, Copeland & Dike
Attys.

UNITED STATES PATENT OFFICE.

WALTER J. BEHN, OF DETROIT, MICHIGAN.

UNIVERSAL JOINT.

1,376,504. Specification of Letters Patent. Patented May 3, 1921.

Application filed February 16, 1920. Serial No. 359,089.

*To all whom it may concern:*

Be it known that I, WALTER J. BEHN, a citizen of the United States, residing at Detroit, county of Wayne, State of Michigan, have invented a certain new and useful Improvement in Universal Joints, of which the following is a specification, reference being had therein to the accompanying drawings.

My invention has for its object the improvement of universal joints of the type ordinarily known as flexible fabric universal joints, and the particular object of the invention is to provide a universal joint of this type which can be manufactured more cheaply and which will be stronger and wear longer. Joints of this type have heretofore been made from a ply or plies of fabric filled with frictioning material vulcanized under pressure. Such disks when composed of a single layer of fabric are much stronger in one direction than in any other and therefore are likely to fail under the constant change in direction of the strain to which they are subjected. Attempts have been made to overcome this difficulty by making the joint of several plies of material laid with the threads composing the fabric at an angle to each other. Thus, where six plies are used, the threads of the respective plies will be arranged radially at angles of about 15° from each other. This is accomplished in practice by making up each disk from the requisite number of squares of material superposed at the proper angles, the disk being then died out from the assembled material. The waste of material when disks are made this way in excessive, being in the neighborhood of 30 per cent., and disks so made do not have the maximum possible strength because only a small proportion of the threads composing the fabric lie in the direction to afford maximum resistance to the strains imposed by the load.

My invention provides a disk in which the fiber composing the threads in the disk lie in the direction to afford maximum resistance to the strains produced by the load. To accomplish this, I make my disks of layers of cord wound circumferentially preferably in flat helices, the helices in adjacent layers being preferably wound in opposite directions. The whole is held together or embedded in frictioning material vulcanized preferably under pressure. Adjacent layers formed as described may be separated if desired by a layer of canvas, and the strain from the fingers of the spiders of the universal joint is distributed equally to all the threads by means of radially ribbed clamping washers occupying the surface of the disk from about the center to about the periphery. By this means, the load is distributed so that each part of the cord carries its share of the load.

As the hereindescribed disks are particularly intended for use in universal joints of the kind described in my prior Patent No. 1,261,683 dated April 2, 1918 in which there is shown a peripheral casing placed outside the disks for the purpose of preventing the elliptical distortion which results when such a universal joint is revolved at high speed and since it has been found in practice that the radial pressure exerted by the edge of the disk on the interior of the casing tends to destroy the disk, I provide the edge of the disk with inserts of wearing material.

The invention will be fully understood from the following description when taken in connection with the accompanying drawings, and the novel features thereof will be pointed out and clearly defined in the claims at the close of this specification.

In the drawings, Figure 1 is a side elevation of a universal joint embodying my invention.

Figure 1:
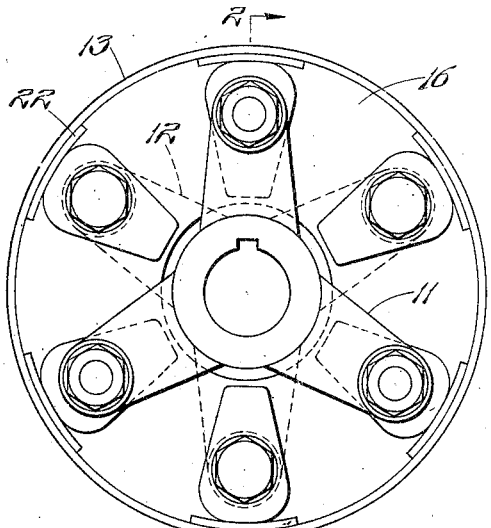
Figure 2:
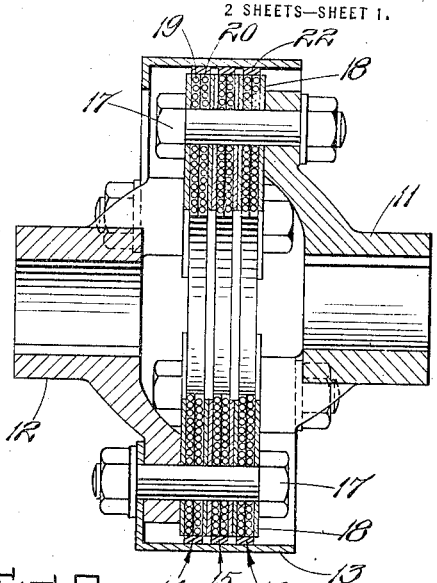
Fig. 2 is a section on line 2, 2 of Fig. 1.
Figure 3:
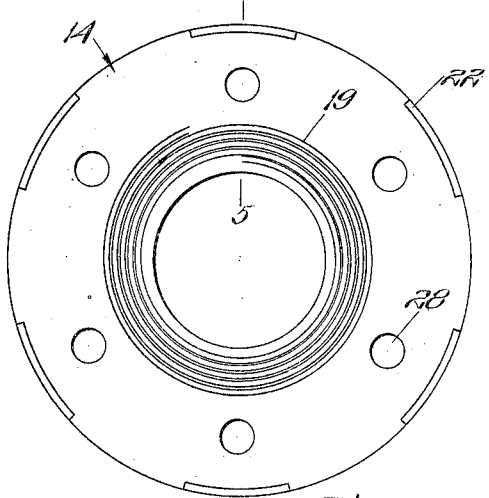
Fig. 3 is a plan of one of the disks showing the arrangement of one helix of cord.
Figure 4:
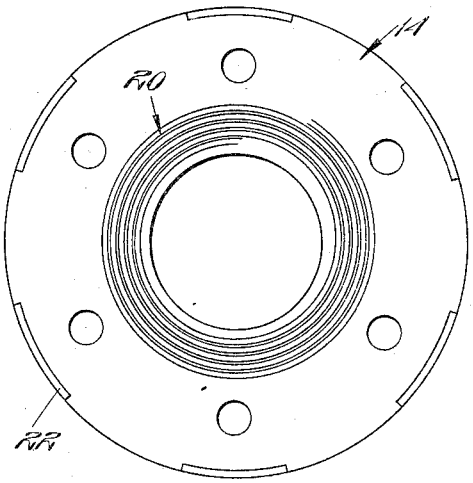
Fig. 4 is a similar view of the disk showing the other helix of cord.
Figure 5:
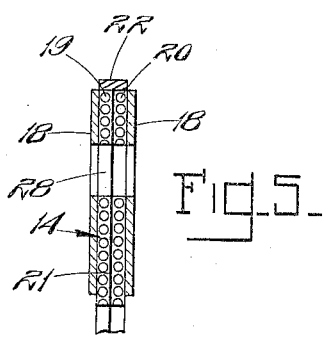
Fig. 5 is a section on line 5, 5 of Fig. 3.
Figure 6:
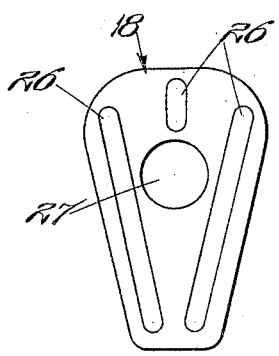
Figs. 6 and 7 are details of the radial washers.
Figure 7:
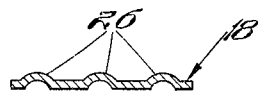

Referring now to the drawings and particularly to Figs. 1 and 2, at 11 and 12 there are shown two three-arm spiders one of which, 12, is provided with a cylindrical exterior casing 13 of the kind shown in my prior Patent No. 1,261,683, dated April 2, 1918. Between the two spiders are one or more flexible disks 14, 15 and 16 secured to the spiders by bolts 17. At 18 there are shown radially ribbed washers the construction of which will be more clearly seen from Figs. 6 and 7. One of the disks 14, 15 or 16 is shown in Figs. 3, 4 and 5. Each disk consists of two or more circumferentially arranged layers 19 and 20 of cord, preferably formed as shown in Figs. 3 and 4 by winding the cord to form a flat helix, the turns composing the helix being laid in contact or practically in contact with each other. In Fig. 5, two such layers of cord are shown. These two layers of cord are preferably wound in opposite directions to compensate for the slight divergence from a true circumferential line in which the turns of cord lie. The cord composing the helix is frictioned and is embedded in frictioning material and the whole vulcanized to form the disk. In practice, I also provide a separating layer 21 of canvas between the two layers of cord. This is a convenience in manufacture and makes the disks less likely to be ruptured in handling, since disks composed solely of two layers of cord and the frictioning material do not have any great radial strength, although they resist circumferential strains with maximum efficiency. In the edges of the disks, there are placed inserts 22 of some suitable wear-resisting material, such as canvas, fiber, metal or brake lining, these wear-resisting strips being located in the best position to resist the injury likely to be done to the edge of the disk when the distortion of the disk produced by the rapid rotation of the joint occurs. These wear-resisting inserts are vulcanized into the edge of the disk.

The radially ribbed sector-shaped washers 18 extend from a point near the center of the disk to the periphery. These washers are provided with substantially radial ribs 26 and are embedded in the disk and vulcanized in place when the disk is vulcanized. Each washer is provided with a hole 27 which registers with one of the holes 28 in the disk through which pass the bolts 17. These bolts 17 not only secure the spider arms to the disks, but also clamp the disks together and compress the disks between the respective washers so that the ribs 26 of the washers compress between them the cords composing the disks. Every turn of cord whether it lies near the center of the disk or near the periphery is thus caused to carry its share of the load imposed on the disk by the spider arms.

Figure 8:
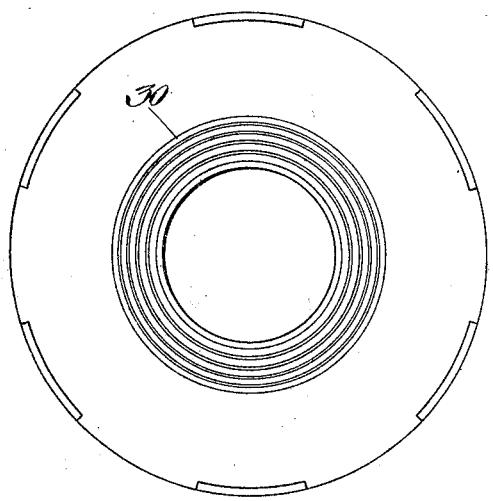
Figs. 8 and 9 are plans of disks embodying my invention in modified form.
Figure 9:
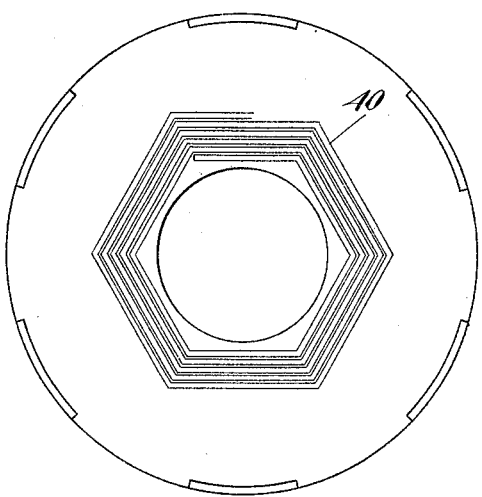

In Fig. 8, I have shown a disk made up of concentric endless cords 30. In Fig. 9, I have shown a disk made up of flat helices of cord 40, but the cords are wound in hexagons so that the portion of the cords lying between any adjacent pair of radially ribbed washers is in a straight line. Under certain circumstances, these modified embodiments of my invention may be more satisfactory than the preferred form shown in the preceding figures.

When the disks embodying my invention are subjected to the load in the operation of the vehicle, the strain comes lengthwise of each of the respective cords and therefore the universal joint has uniform strength in all directions. Furthermore, all of the fibrous material composing the cords is employed in carrying the load and therefore a much stronger joint can be made with a given amount of material.

What I claim is:—

1. The disk for a flexible universal joint which includes a layer composed of substantial peripheral concentric cords embedded in frictioning material.

2. The disk for a flexible universal joint which includes a layer composed of cord wound in a flat helix and secured together by frictioning material.

3. The disk for a flexible universal joint which includes two layers each composed of cord wound into a flat helix and secured together by frictioning material.

4. The disk for a flexible universal joint which includes two parallel layers of cord wound into opposite flat helices.

5. The disk for a flexible universal joint which includes two or more parallel layers of cord wound into opposite flat helices separated by a layer of canvas and secured together by vulcanized frictioning material.

6. The flexible universal joint which comprises two oppositely disposed spiders, a plurality of disks composed of oppositely wound flat helices of cord secured together by frictioning material, and washers at the joints of contact of the spiders with the disk, said washers extending from a point near the center of the disk to a point near the periphery.

7. The flexible universal joint which comprises two oppositely disposed spiders, a plurality of disks composed of oppositely wound flat helices of cord secured together by frictioning material, and washers at the points of contact of the spiders with the disk, said washers extending from a point near the center of the disk to a point near the periphery and being radially ribbed on the face in contact with the disk.

8. The flexible universal joint which comprises two oppositely disposed spiders, a peripheral inclosing member, and flexible disks having in its periphery inserts of wearing material formed integrally with the disk at the points of contact with the inclosing member.

In testimony whereof I affix my signature.

WALTER J. BEHN.